Nov. 10, 1953    L. C. SMITH    2,658,812
VALVE LIFT RECORDER
Filed Aug. 3, 1949    5 Sheets-Sheet 1

Inventor
LEONARD C. SMITH
By
Attorney

Nov. 10, 1953     L. C. SMITH     2,658,812
VALVE LIFT RECORDER

Filed Aug. 3, 1949     5 Sheets-Sheet 3

Inventor
LEONARD C. SMITH

Nov. 10, 1953  L. C. SMITH  2,658,812
VALVE LIFT RECORDER

Filed Aug. 3, 1949  5 Sheets-Sheet 4

Inventor
LEONARD C. SMITH

By
Attorney

Nov. 10, 1953 L. C. SMITH 2,658,812
VALVE LIFT RECORDER

Filed Aug. 3, 1949 5 Sheets-Sheet 5

INVENTOR
LEONARD C. SMITH

Patented Nov. 10, 1953

2,658,812

UNITED STATES PATENT OFFICE 2,658,812

VALVE LIFT RECORDER

Leonard C. Smith, Berea, Ohio

Application August 3, 1949, Serial No. 108,401

3 Claims. (Cl. 346—3)

(Granted under Title 35, U. S. Code (1952), sec. 266)

The present invention relates to an engine indicating system, and more particularly to a system for automatically indicating the performance of the valves of either single cylinder or multi-cylinder engines at any engine speed.

Several systems have been devised for measuring the performance of engine valves, one of which employs a high speed camera to record valve lift by measuring the distance between a mark on the valve and a reference point on the engine frame. This system is not direct reading and the performance curve must be plotted from difficult measurements on the film. In addition, the time to engine crank angle conversion is difficult to evaluate correctly unless the camera is geared to the engine.

Another system for measuring valve lift employs a calibrated timer on the engine cam shaft and a neon lamp which ignites only at the timer designated crank angle, the lamp being observed through three apertures, two being in a carriage actuated by a micrometer screw and the third being in a probe fastened to the valve. Thus, when the light was observed by the operator, the crank angle setting at this point was read on the calibrated timer, and the valve lift was obtained from the micrometer screw setting.

The neon lamp system is subject to human error, since it is not automatically recording. Furthermore, only one point is obtained in several minutes, and it would require an excessive length of time to obtain the entire curve of valve performance.

According to the present invention, these and other disadvantages of the prior art systems are overcome by the provision of a system consisting of a pickup unit that replaces the rocker box of the valve being studied, a recording unit driven by the engine crank-shaft, a probe mounted on the valve to move therewith, and recording means operable when the pickup unit bears a particular relationship with respect to the probe. Since the recording unit is driven by the engine crank-shaft, one reference of the curve is obtained, namely the crank angle position.

In a preferred form of the invention, the pickup unit comprises a contact which is progressively advanced with respect to the position of the valve, this advancement being in synchronism with the movement of the recording means. Actuation of the recording means occurs whenever the contact on the valve probe comes into engagement with the pickup contact.

According to another embodiment of the invention the pickup unit comprises a chamber connected in the cylinder and having a diaphragm therein, and a variable source of pressure on one side of the diaphragm. Actuation of the recording means occurs whenever the variable pressure balances the cylinder pressure.

Accordingly, an object of the present invention is the provision of a system for automatically indicating quantitatively the variations in a periodic event of an engine during operation.

Another object is to provide an engine performance indicating system capable of recording several diagrams without stopping the engine.

A further object is to provide an engine performance indicating system which may be used with either single cylinder or multicylinder engines.

Still another object of this invention is the provision of a system for automatically recording the valve lift of an engine with respect to the engine crank angle.

A still further object is to provide a system for indicating the pressure variation of a valve of an engine with respect to the crank angle position.

The exact nature of this invention as well as other objects and advantages thereof will be readily apparent from the consideration of the following specification relating to the annexed drawing in which.

Figure 1:
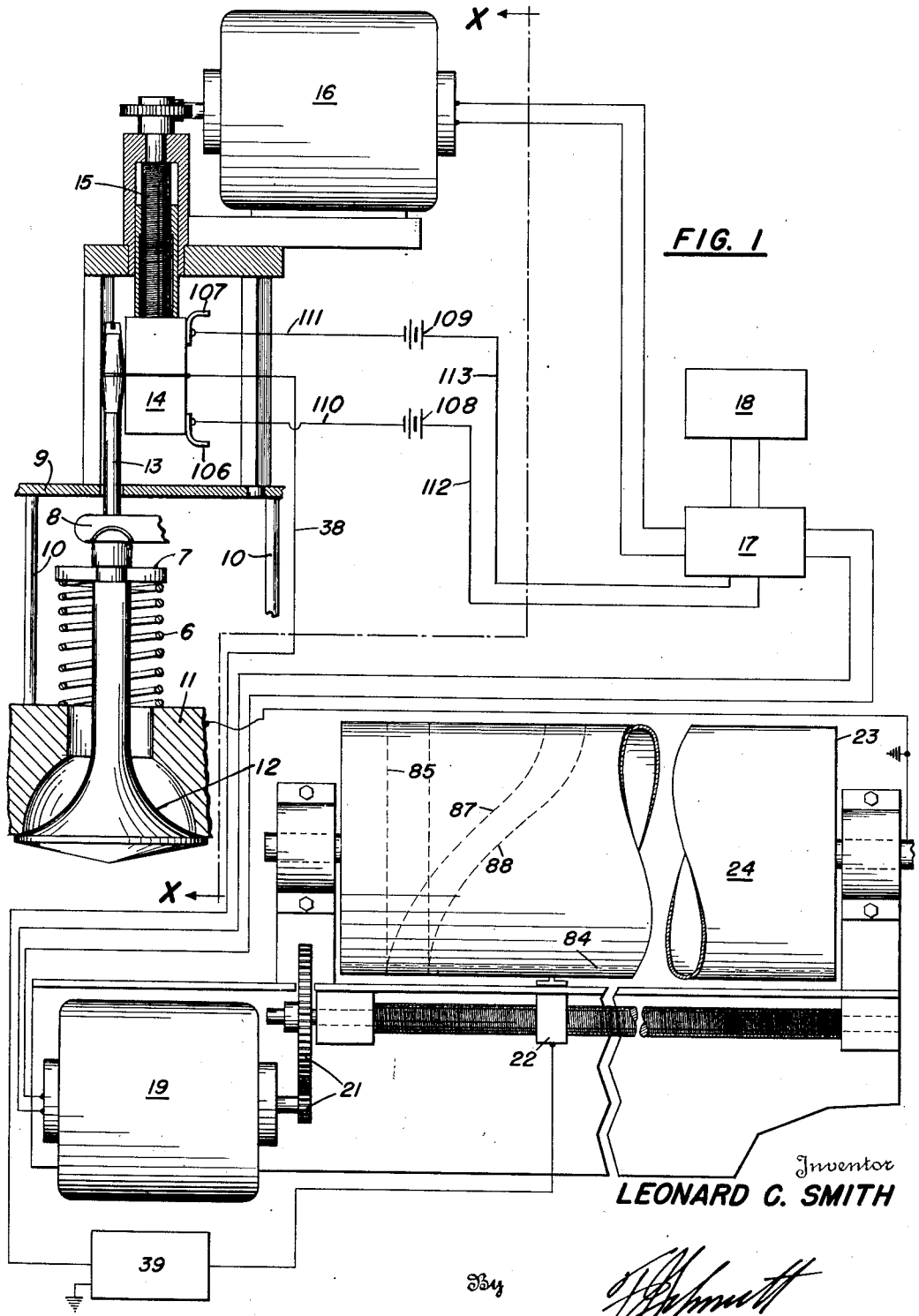
Fig. 1 illustrates schematically, partly in longitudinal section, a preferred form of the invention wherein a curve of valve lift versus crank angle is obtained.
Figure 7:
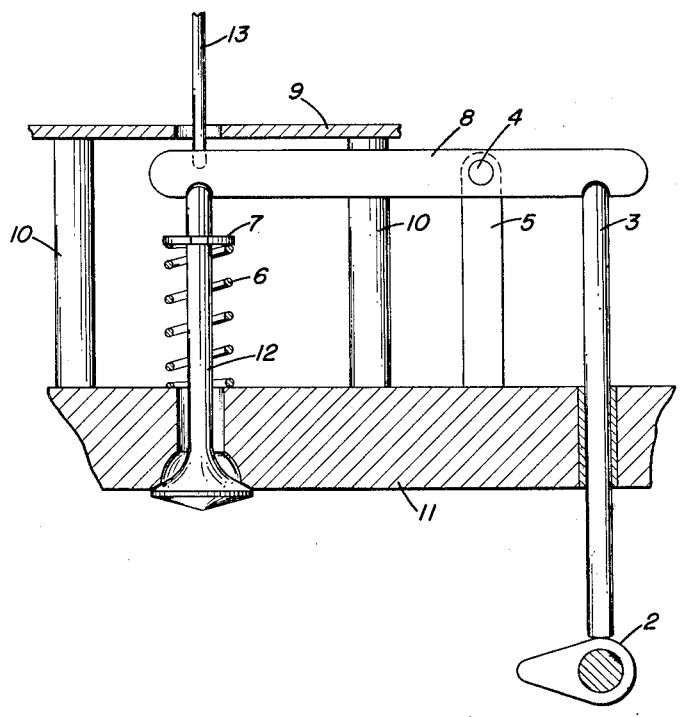
Fig. 7 is a diagrammatic representation of a conventional valve actuating mechanism for the apparatus shown in Fig. 1.

Referring now to the drawings, wherein like reference characters designate like or corresponding parts throughout the several views, there is shown in Figs. 1 and 7, which illustrate a preferred embodiment, a portion 11 of the engine block under test having a valve stem 12 therein.

Suitably fastened to the upper end of valve stem 12, or to the valve spring washer, not shown, is a probe 13, the probe moving along with the valve stem during operation of the engine. Mounted adjacent to, and for movement in a plane parallel to the plane of movement of, probe 13, is a contact block 14, driven by micrometer screw 15, which in turn is driven by synchronous motor 16. The actuating mechanism for the valve stem 12 is shown in Fig. 7. It is seen that the valve stem 12 is actuated by means of an engine driven cam 2 which actuates the pusher rod 3 in a conventional manner. A rocker arm 8, pivoted on the member 5, at a pivot 4, is securely connected to one end of the probe 13 and rides, as shown, on the valve stem 12. A valve return spring 6 is mounted between the engine block 11 and a U-shaped washer 7 securely mounted on the valve stem 12. A mounting base 9 for mounting the contact block 14 (as shown in Fig. 1) and its associated elements is supported over the engine block 11 by means of supporting members 10.

The operation of motor 16 is controlled by relay box 17 which may, if desired, be controlled from remote control box 18, in a manner to be set forth below. Boxes 17 and 18 are arranged to control the operation of a second motor 19, motors 16 and 19 being of the synchronous type so that they operate at exactly the same speed. Motor 19 drives, through means of reduction gearing 21, scribing means or spark contact 22, contact 22 moving at a rate 10 times as fast as contact block 14. Spark contact 22 is arranged to longitudinally traverse recording drum 23 having the recording paper 24 thereon, drum 23 being directly driven from the engine crankshaft whereby the drum position is indicative of the engine crank angle at all times.

Figure 2:
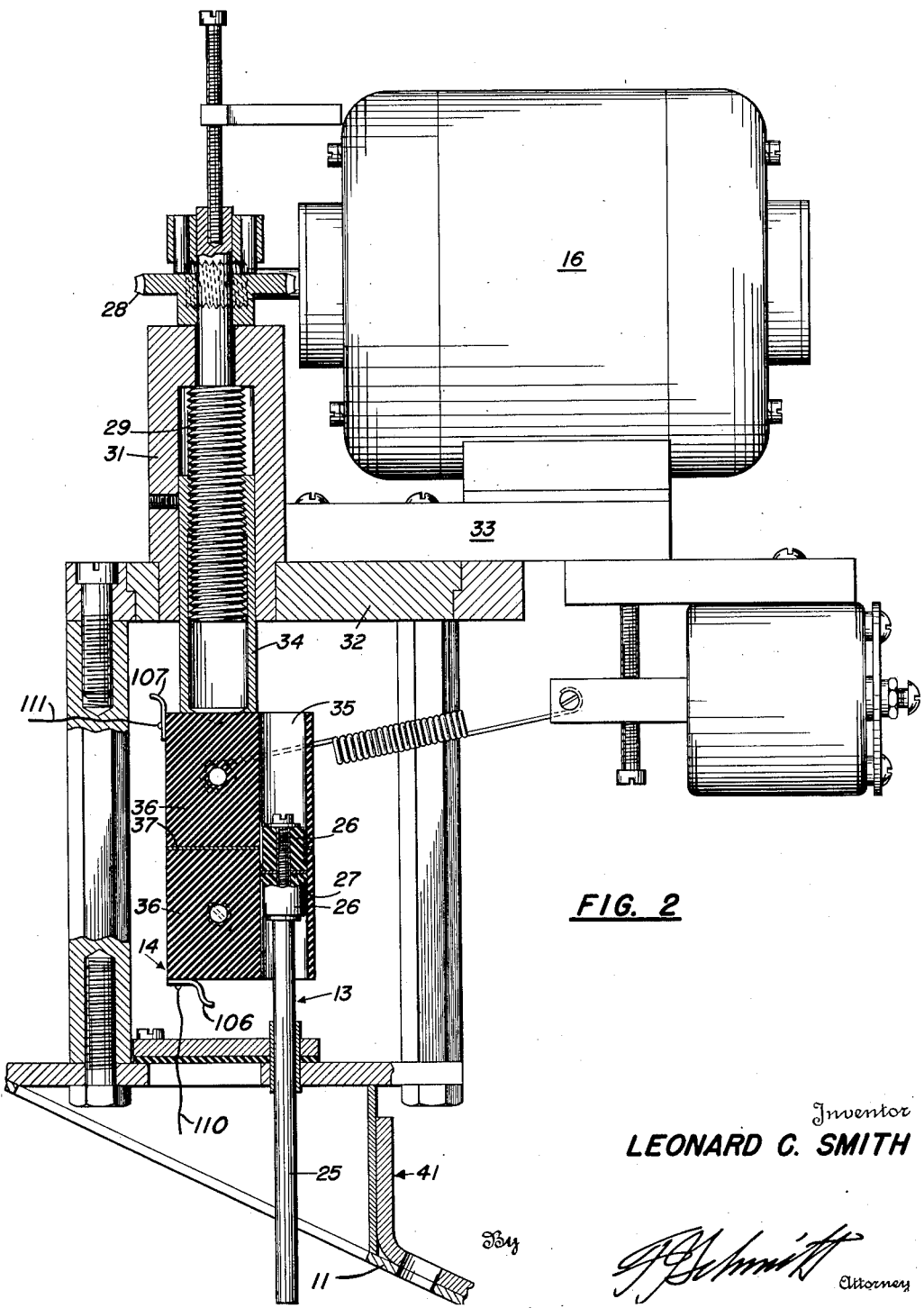
Fig. 2 is a detailed side elevational view, partly in section of, the pickup unit of Fig. 1.

Referring now to Fig. 2, wherein are shown the details of the pickup unit comprising probe 13, contact block 14 and motor 16, it is seen that probe 13 comprises a tubular lower portion 25, preferably made of stainless steel, which is attached to valve stem 12, as shown in Fig. 1, and an upper portion consisting of two insulating pieces 26, 26, preferably of Mycalex, with a conducting sheet or contact 27 sandwiched between the pieces. Sheet 27 is preferably made of bronze and is 0.001 inch thick, in order to provide a thin contact point, sheet 27 being electrically connected to engine block 11 which is grounded for the purpose set forth below. Probe 13 is of very light weight so as not to affect the valve motion, it being readily apparent that the distance moved by probe 13 is equal to the valve lift, and that one complete cycle of movement of probe 13 will occur for every two revolutions of the engine crankshaft.

When the probe 13 is attached to a valve 12, a special rocker arm is used which has an annular portion arranged to encircle the probe 13 and engage the end of the stem of valve 12 which is larger in diameter than the probe 13, as shown in Fig. 1.

As shown in Fig. 2, motor 16 drives gear 28 which is mounted on the upper end of a micrometer screw 29 supported in screw housing 31, which in turn is mounted in support 32 suitably fastened to base plate 33 of motor 16. Threadedly supported on screw 29 is a contact carrier 34 having a bored lower portion 35 aligned with probe 13 to permit the passage of the probe therethrough, as shown in Fig. 2. Carrier 34 also supports, at its lower end, contact block 14 which comprises a pair of insulating pieces 36, 36, preferably made of Mycalex, having a conducting sheet or contact 37 sandwiched therebetween.

Block 14 and screw 29 must be precision built so that no relative motion is possible between contact sheet 37 and the frame of the engine around the valve, except that resulting from operation of motor 16. Sheet 37 is preferably made of bronze of a thickness of approximately 0.001 inch in order to provide for accurate recording, sheet 37 being electrically connected by means of lead 38 to one input terminal of recording circuit 39, the other input terminal of circuit 39 being grounded, as shown in Fig. 1.

Support 32 is carried by a mounting bracket, generally designated 41, which is secured to portion 11 of the engine block in any suitable manner, provision being made for the freedom of movement of probe 13, as shown in Fig. 2. It is thus seen that, at each instant contact sheets 27 and 37 are aligned, the input terminals of recording circuit 39 will be shorted.

Figure 3:
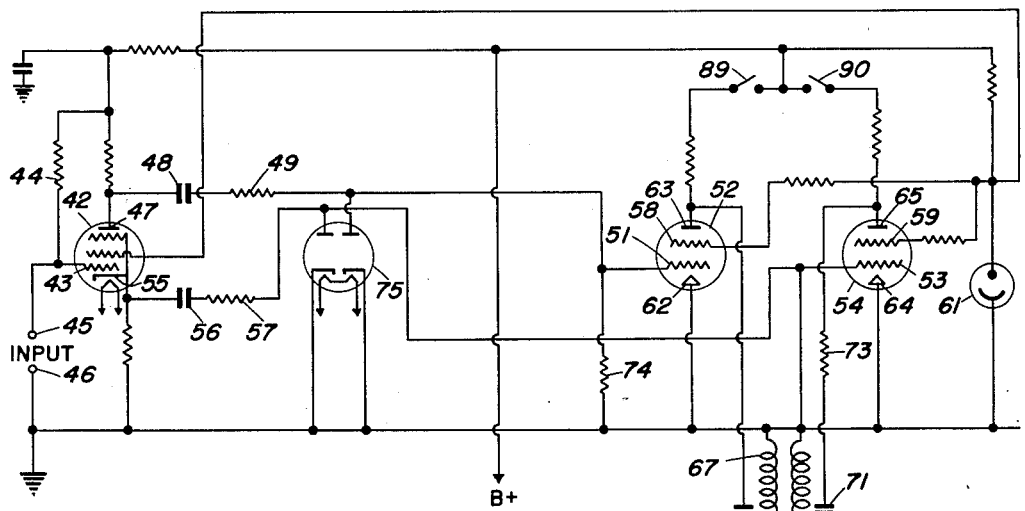
Fig. 3 is a schematic diagram of one form of electronic recording circuit according to the invention.

Referring now to Fig. 3, wherein is shown one form of recording circuit 39 for use in the system of Fig. 1, there is shown an amplifier tube 42 having its control grid 43 returned to the plate supply by means of resistor 44, input terminals 45 and 46 of circuit 39 being connected to grid 43 and ground, respectively. Thus, when sheets or contacts 27, 37 are open, a large plate current flows through tube 42. However, when contacts 27, 37 close, grid 43 is lowered to ground potential and the plate current of tube 42 is greatly reduced. Thus, in operation, a rectangular wave of plate current flows through tube 42, the duration of which is controlled by the making and breaking of contacts 27, 37.

Connected to plate 47 of tube 42, by means of coupling condenser 48 and resistor 49, is the first grid 51 of a relay tube 52. The first grid 53 of a relay tube 54 is connected to the cathode 55 of tube 42 by means of condenser 56 and resistor 57. Tubes 52 and 54 are preferably of the strobotron type and carry a positive bias on the second grids 58, 59, respectively, this voltage being controlled by a voltage regulator tube 61. Thus, when a negative voltage appears on either grid 51 or grid 53, a glow discharge takes place between the grids of the tube and the tube ignites. The main discharge then takes place between either cathode 62 and anode 63 of tube 52, or cathode 64 and anode 65 of tube 54.

Upon ignition of tube 52, the charge on condenser 66 flows from plate 63 through tube 52 and the primary 67 of spark coil 68. This surge of current induces a high voltage pulse in secondary winding 69 of coil 68, and the resulting spark is used to make a record on the indicator diagram or paper 24 on drum 23 through contact 22. A similar circuit is arranged for tube 54, including condenser 71 and spark coil 72. Tubes 52 and 54 are self-extinguishing, and the power supply, not shown, recharges condensers 66 and 71 to ready the circuit for another initiating pulse.

In operation, when contacts 27, 37 close, the current through tube 42 drops and a negative pulse is produced on grid 53 by the differentiating circuit consisting of condenser 56 and grid resistor 73. When contacts 27, 37 open, the current rises and a negative pulse is similarly produced by the differentiating circuit consisting of condenser 48 and grid resistor 74. The positive pulses produced are by-passed to ground through duo-diode rectifier tube 75, connected as shown in Fig. 3.

It is thus seen that circuit 39 provides a means for producing a marking spark whenever contacts 27, 37 make or break, and that independent channels for operation on make and break are provided, each of which may operate within a very small time interval of the other. This permits the instrument to have greater stability and freedom from spurious marking signals, particularly when used in pressure recording as set forth below, and to be constructed of small standard parts and still record sharp left peaks in one operation. For valve lift recording, only the make channel is necessary so switches 89, 90 are provided to permit each channel to be rendered inoperative. It is to be understood that the circuit shown is merely illustrative and that any other suitable recording circuit may be used.

Figure 4:
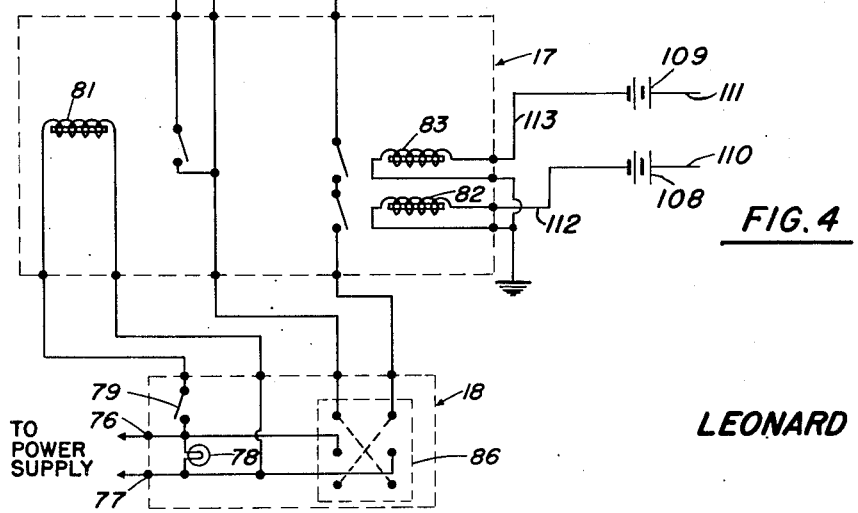
Fig. 4 is a schematic diagram illustrating one form of control box and relay box for use in the system of Fig. 1.

Referring now to Fig. 4, wherein is shown one form of control box 18 and relay box 17, it is seen that control box 18 comprises input terminals 76, 77 for the power supply and a pilot light 78 for indicating operation of the power supply. Control box 18 also contains a spacing switch 79 for operating a normally closed spacing relay 81 to thereby disconnect pickup motor 16 from the power supply and permit motor 19 to operate separately. In this manner spark contact 22 may be independently displaced from its original starting point on drum 23, for example one half inch, so that a plurality of diagrams may be produced on a single sheet of recording paper 24.

Control box 18 also contains a switch 86 or a plurality of switches, for operating motors 16 and 19 in either direction. Relay box 17 contains spacing relay 81 and its contacts, and a pair of limit switches or relays 82, 83 for controlling the limits of movement of motor 16 and contact block 14. Limit switches 82 and 83 are positioned to operate to stop motors 16 and 19 whenever contact 37 has reached either the upper or lower limit of movement of contact 27, or of the valve. In practice, the limit switches are placed slightly beyond this contacting range in order to permit motors 16 and 19 to reach synchronism before recording begins. Relays 82 and 83 may be operated by battery circuits which include the limit contacts 106 and 107 on the ends of block 14 as shown in Figs. 1 and 2 and the respective batteries 108 and 109 negative sides of which are connected by leads 110 and 111 to the insulated contacts 106 and 107 and the other sides of which are connected by leads 112 and 113 to the live terminals of the relays 82 and 83 respectively.

In operation spark contact 22 is run at a speed of about 15 inches per minute while contact 37 operates at a speed of 1.5 inches per minute in order to permit amplification of the recordings. In order to orient the diagrams the engine under test is set on top dead center and input terminals 45, 46 of circuit 39 are shorted so that recording occurs, spark contact 22 being driven at this time by motor 19. In this manner the top dead center line 84 is obtained, as shown in Fig. 1.

A horizontal reference line 85 is obtained by shorting terminals 45, 46 while drum 23 is turning. Upon actuation of switch 86, motors 16 and 19 operate in synchronism thereby moving contact 37 and spark contact 22, drum 23 being driven by the crankshaft of the engine. Assuming that contact 37 begins its movement at the lower limit, once contact 37 enters the region of movement of contact 27, two points will appear on paper 24 for every instantaneous position of contact 37, these points occurring during the valve lift period, or for every two revolutions of the crankshaft.

As contact 37 is progressively advanced, the points on the curve draw closer together until finally a single point is obtained when contact 37 reaches the upper limit of the valve motion. Contact 37 continues to advance upwardly for a short distance until upper limit switch 82 is actuated and motors 16 and 19 are stopped. Spacing switch 79 is then actuated so that motor 19 may be operated independently to space contact 22 in order to permit the recording of a second curve at a different speed or manifold pressure. Switch 86 is then actuated to run motors 16 and 19 in the opposite direction until limit switch 83 is actuated to again stop the motors, portions 87, 88 of two curves so obtained being shown in Fig. 1. In this manner a plurality of curves of valves performance may be obtained on a single sheet without stopping the engine.

Figure 5:
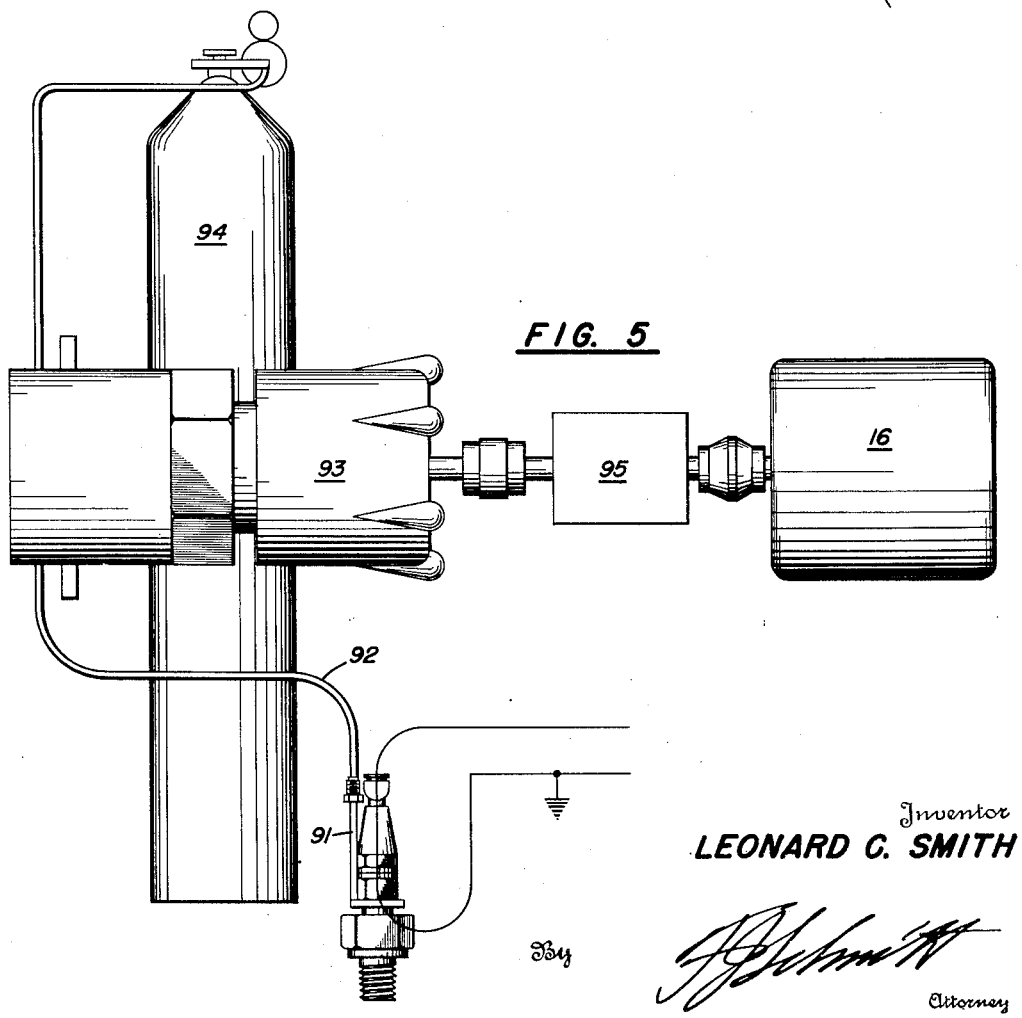
Fig. 5 illustrates a second embodiment of the present invention wherein a curve of engine cylinder pressure versus crank angle may be obtained, this second embodiment being a modification of the system of Fig. 1 taken along the line X—X of Fig. 1.

Referring now to Fig. 5, wherein is shown a second embodiment of the present invention designed for measuring cylinder pressure variations with respect to crank angle, probe 13 is replaced by a switch type pressure pickup unit 91, to one side of which is connected a line 92 having its input end connected to the output of a pressure controlling mechanism 93.

Mechanism 93 may be any suitable pressure regulator designed to maintain a constant delivered pressure in line 92 from a source 94 for a predetermined setting of the regulator. One suitable regulator is the Grove Small Volume Regulator, model 15–H, manufactured by the Grove Regulator Co. of Oakland, California, although it is to be understood that any other regulator may be used.

The setting of mechanism 93 is controlled by synchronous motor 16 through the intermediary of a gear reduction unit 95, it being readily seen that the pressure delivered to line 92, and to one side of pickup 91, will be varied between predetermined minimum and maximum values in accordance with the operation of motors 16 and 19. Limit switches 82, 83 are made responsive to the maximum and minimum pressures, respectively, so as to stop motors 16 and 19 when these values have been attained.

Figure 6:
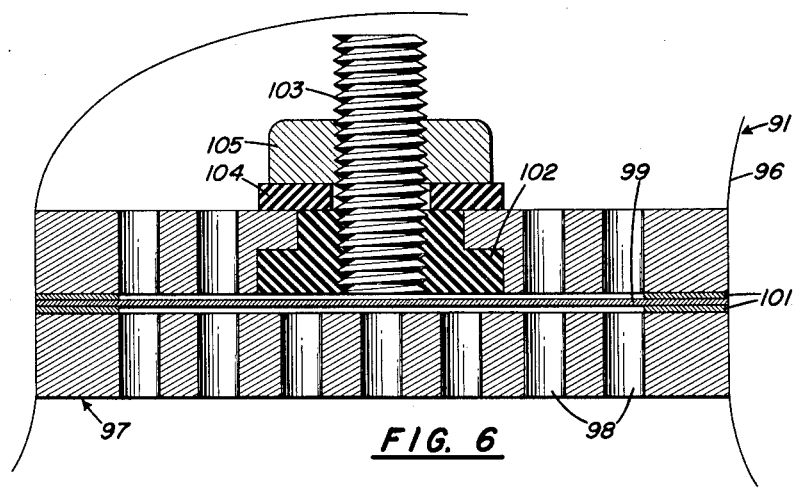
Fig. 6 is a sectional side elevational view of the pressure pickup switch of Fig. 5.

Pickup unit 91, as shown in Fig. 6, comprises a casing 96 designed to be mounted over the engine cylinder whose pressure is to be measured, preferably by screwing it into the spark plug opening. Mounted in casing 96 is a block 97 having air passages 98 therein, there being a conducting diaphragm 99 mounted longitudinally centrally within block 97 by means of washers 101. Mounted in the upper central portion of block 97 is an internally threaded insulating insert 102 supporting a conducting contact screw 103, screw 103 being retained in position on block 97 by means of insulating washer 104 and nut 105.

In operation, for a given value of balancing pressure introduced into the upper end of casing 96, diaphragm 99 will not contact screw 103 so long as the engine cylinder pressure remains below this given value. When the engine pressure equals the balancing pressure, diaphragm 99 will contact screw 103 thereby shorting input terminals 45, 46 of recording circuit 39. Terminals 45, 46 remaining shorted until the engine cylinder falls just below the balancing pressure. Thus, for each cycle of engine pressure, two points will be recorded, one at the making or engaging of diaphragm 99 and screw 103 and the other at the breaking or disengaging of diaphragm 99 and screw 103. By varying the balancing pressure progressively, by means of motor 16 and mechanism 93, the entire curve of pressure versus crank angle can be obtained, if the pressure diagram is calibrated in accordance with the settings of mechanism 93.

It is thus apparent that the present invention contemplates a system for recording the performance of an engine by measuring the instantaneous value of a periodic event with respect to the crank angle or engine cycle position. Although the invention has been disclosed specifically as applicable to valve lift and cylinder pressure, it is obvious that the system may be applied to measure other variables, so long as the reference source, that is contact 37 or the balancing pressure, is arranged to vary between the limits of variations of the particular event to be recorded.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A performance testing device for recording variations in the value of a cyclically variable significant characteristic of a cyclically operating machine, comprising a recording drum having a positive drive connection for operation by the machine so as to maintain a constant relation between the cycle of operation of the machine and the angular position of said drum, a spark scriber movable axially along one side of said drum, a spark sensitive record sheet mounted on said drum for receiving the record, a circuit for effectuating said spark scriber to produce a mark on said sheet, adjustable contact mechanism operative whenever said cyclically variable significant characteristic reaches one particular value to close said circuit and effectuate said spark scriber, means for adjusting said contact mechanism to respond to different instantaneous values of said characteristic, and means for operating said adjusting means and moving said spark scriber in direct proportion so as to provide a direct relation between the value of the significant characteristic being recorded and the axial position of said scriber, whereby a series of readings is obtained which defines a curve useful in evaluating the performance of the machine.

2. A device as defined in claim 1, wherein the significant characteristic recorded is the position of an engine valve to determine its travel path with respect to its operating means at various speeds of engine operation.

3. A device as defined in claim 1, wherein the significant characteristic recorded is the position of an engine valve to determine its travel path with respect to its operating means at various speeds of engine operation and control means for the means operating the adjusting means including contact switches to automatically stop said operating means when the extreme positions in the movement of the valve are reached by the contact mechanism.

LEONARD C. SMITH.

References Cited in the file of this patent

UNITED STATES PATENTS

| Number | Name | Date |
|---|---|---|
| 1,631,285 | Musselman | June 7, 1927 |
| 1,655,615 | Kreisel | Jan. 10, 1928 |
| 1,890,601 | Cox | Dec. 13, 1932 |
| 2,085,203 | Schlesman et al. | June 29, 1937 |
| 2,202,935 | Weiss | June 4, 1940 |
| 2,212,319 | Gerdts | Aug. 20, 1940 |
| 2,255,809 | Prescott | Sept. 16, 1941 |
| 2,380,704 | Morgan et al. | July 31, 1945 |
| 2,381,273 | Froehlich | Aug. 7, 1945 |
| 2,464,612 | Rich | Mar. 15, 1949 |

FOREIGN PATENTS

| Number | Country | Date |
|---|---|---|
| 294,126 | Great Britain | July 16, 1928 |
| 615,788 | Great Britain | Jan. 11, 1949 |